United States Patent
Yu et al.

(10) Patent No.: US 11,716,169 B2
(45) Date of Patent: Aug. 1, 2023

(54) METHOD FOR ERROR HANDLING OF AN INTERCONNECTION PROTOCOL, CONTROLLER, AND STORAGE DEVICE

(71) Applicant: SK hynix Inc., Icheon-si Gyeonggi-do (KR)

(72) Inventors: Cheng Wei Yu, Zhubei (TW); Wen Jyh Lin, Zhubei (TW); Lan Feng Wang, Zhubei (TW)

(73) Assignee: SK hynix Inc., Incheon- si (KR)

( * ) Notice: Subject to any disclaimer, the term of this patent is extended or adjusted under 35 U.S.C. 154(b) by 18 days.

(21) Appl. No.: 17/684,080

(22) Filed: Mar. 1, 2022

(65) Prior Publication Data

US 2023/0188256 A1    Jun. 15, 2023

(30) Foreign Application Priority Data

Dec. 9, 2021  (TW) .................................. 110146042

(51) Int. Cl.
*H04L 1/00*      (2006.01)
*H04L 67/1097*   (2022.01)

(52) U.S. Cl.
CPC .......... *H04L 1/0046* (2013.01); *H04L 1/0041* (2013.01); *H04L 1/0067* (2013.01); *H04L 67/1097* (2013.01)

(58) Field of Classification Search
CPC ... H04L 1/0046; H04L 1/0041; H04L 1/0067; H04L 67/1097
See application file for complete search history.

(56) References Cited

U.S. PATENT DOCUMENTS

| | | | |
|---|---|---|---|
| 8,452,926 B2 | 5/2013 | Gentric et al. | |
| 8,847,691 B2 | 9/2014 | Zhu et al. | |
| 9,086,966 B2 | 7/2015 | Wagh et al. | |
| 9,405,718 B2 | 8/2016 | Ranganathan et al. | |
| 10,423,552 B2 | 9/2019 | Harriman | |
| 2009/0292788 A1* | 11/2009 | Miyamae | H04L 67/1095 709/211 |
| 2015/0312006 A1* | 10/2015 | Goulahsen | G06F 13/4295 714/749 |
| 2022/0206966 A1* | 6/2022 | Kim | H04L 7/0008 |

FOREIGN PATENT DOCUMENTS

| | | |
|---|---|---|
| KR | 1020160016485 A | 2/2016 |
| WO | 2010022185 A1 | 2/2010 |

* cited by examiner

*Primary Examiner* — Shelly A Chase
(74) *Attorney, Agent, or Firm* — William Park & Associates Ltd.

(57) ABSTRACT

A method for error handling of an interconnection protocol, a controller and a storage device are provided. The method for error handling of an interconnection protocol is for use in a first device that is linkable to a second device according to the interconnection protocol, the method comprising: during or after a power mode change of a link between the first device and the second device: a) triggering, by the first device, a first line reset signal to the second device; b) performing, by the first device, suppression of detected rate overlap errors; and c) stopping the suppression of detected rate overlap errors after the first device receives a second line reset signal from the second device.

15 Claims, 13 Drawing Sheets

METHOD FOR ERROR HANDLING OF AN INTERCONNECTION PROTOCOL, CONTROLLER, AND STORAGE DEVICE

CROSS-REFERENCE TO RELATED APPLICATION

The present application claims priority under 35 U.S.C. § 119(a) to Taiwanese Patent Application No. 110146042 filed on Dec. 9, 2021, in the Taiwan Intellectual Property Office, which is incorporated herein by reference in its entirety.

BACKGROUND OF THE INVENTION

1. Field of the Invention

The present disclosure relates to an electronic device, and in particular to a method for error handling of an interconnection protocol, a controller and a storage device.

1. Description of the Related Art

Because a quantity of data produced and processed in the current mobile devices (e.g., smartphones, tablets, multimedia devices, wearable devices and other computing devices) is continuously increasing, the interconnection interface technology of the chip to chip inside the mobile devices or affected by the mobile devices needs to further evolve to meet higher transmission speeds, low power operation, scalability, support for multitasking, easy adoption and other goals.

To achieve the above goals, the Mobile Industry Processor Interface (MIPI) alliance has developed interconnection interface technologies that meet these goals, such as the MIPI M-PHY specification for the physical layer and the MIPI UniPro specification for the Unified Protocol (UniPro). On the other hand, the Joint Electronic Device Engineering Council (JEDEC) introduced the next generation of high-performance non-volatile memory standards, known as Universal Flash Storage (UFS), using the MIPI M-PHY specification and the unified protocol MIPI UniPro specification. It enables high-speed transmission at one billion bits per second and low-power operation, and provides the functionality and scalability required for high-end mobile systems, thus facilitating to be adopted fast by the industry.

Technicians should ensure that the function and operation of the products are in compliance with the specifications when they develop the products related to chips, electronic modules or electronic devices according to these interconnection interface technologies. For example, as to systems implemented according to UFS standards, such as comprising a computing device and a storage device of non-volatile memory, the computing device and the storage device respectively play the role of local host and remote device. A two-way link is established between the host and the device, and the link between the host and the device can be configured as multiple lanes in either transmission direction. Correspondingly, the host and the device each configure the processing circuit of the interconnection protocol according to the UniPro specification, which must have the function of processing multiple lanes.

The UFS standard uses the UniPro specification to define multiple protocol layers in the link layer, which comprise the physical adapter layers, data link layers, network layers and transport layers. Since the UniPro specification primarily defines the functionality of each protocol layer, and defines a conceptual service access point model to specify the interfaces of the services provided by each protocol layer for implementation, in compliance with the requirements of the UniPro specification, development engineers need to utilize individual technical solutions, possibly using hardware, firmware or software for specific implementations.

According to the UniPro specification, error handling needs to be implemented at various protocol layers, such as the physical adapter layer and the data link layer, when any party in the host and the device (or be called the target end) finds that there is an error in the received data, the party (or the target end) that finds the error should actively send a notification signal indicating the occurrence of the error to the other party (or be called the initiator), and thus triggers the other party (or initiator) to transmit data or other processing. On the other hand, a certain protocol layer (such as the physical adapter layer) that finds an error needs to report the error up to its upper layer (such as the data link layer).

It can be seen that error handling is indispensable when implementing electronic devices according to interconnection protocols such as the UFS standard. The error handling requires the consumption of computing data in electronic devices, and if the electronic device fails to handle errors correctly and efficiently, the performance of electronic devices may be affected, and there may be a risk of unknown behavior.

BRIEF SUMMARY OF THE INVENTION

The implementing method provides a technology for error handling of an interconnection protocol, for use in a first device that is linkable to a second device according to the interconnection protocol. The technology can correctly and efficiently implement the error handling under the interconnection protocol in processing of the first device receiving a frame from the second device to indicate the transmission of the notification signal that the error occurred.

Based on the technology, various implementing methods are proposed, such as the method for error handling of an interconnection protocol, the controller, and the storage device.

The implementing method provides a method for error handling of an interconnection protocol, for use in a first device that is linkable to a second device according to the interconnection protocol, the method comprising: during or after a power mode change of a link between the first device and the second device: a) triggering, by the first device, a first line reset (LINE-RESET) signal to the second device; b) performing, by the first device, suppression of detected rate overlap (RateOverlap) errors; and c) stopping the suppression of detected rate overlap (RateOverlap) errors after the first device receives a second line reset signal from the second device.

The implementing method provides a controller for use in a first device that is linkable to a second device according to an interconnection protocol, and the controller comprises: an interface circuit and a device controller. The interface circuit is configured to implement a physical layer of the interconnection protocol so as to link to the second device. The device controller is configured to be coupled to the interface circuit and configured to implement a link layer of the interconnection protocol. During or after a power mode change of a link between the first device and the second device, the device controller is configured to perform a plurality of operations, the plurality of operations including: a) triggering, by the first device, a first line reset (LINE-RESET) signal to the second device; b) performing, by the first device, suppression of detected rate overlap (RateOverlap) errors; and c) stopping the suppression of detected rate overlap (RateOverlap) errors after the first device receives a second line reset signal from the second device.

The implementing method provides a storage device (e.g., first device), operable to link to a host (e.g., second device) according to an interconnection protocol, and the storage device comprises: a storage module, an interface circuit and a device controller. The interface circuit is configured to implement a physical layer of the interconnection protocol so as to link to the host. The device controller is configured to be coupled to the interface circuit and the storage module and configured to implement a link layer of the interconnection protocol, wherein during or after a power mode change of a link between the first device and the second device, the device controller is configured to perform a plurality of operations, the plurality of operations including: a) triggering, by the first device, a first line reset (LINE-RESET) signal to the second device; b) performing, by the first device, suppression of detected rate overlap (RateOverlap) errors; and c) stopping the suppression of detected rate overlap (RateOverlap) errors after the first device receives a second line reset signal from the second device.

In some embodiments of the above method, controller or storage device, the power mode change is a change from a first rate to a second rate, a transmitter and a receiver of the first device share a single phase-locked loop circuit while a transmitter and a receiver of the second device utilize respective phase-locked loop circuits.

In some embodiments of the above method, controller or storage device, before step a) or operating step a), the first device activates a suppression module for rate overlap error suppression for the link.

In some embodiments of the above method, controller or storage device, in step a) or operating step a), the first line reset signal makes the transmitter and the receiver of the first device and the receiver of the second device reset to the first rate.

In some embodiments of the above method, controller or storage device, in step b) or operating step b), the first device determines a frame that is sent by the second device and not at the first rate as a detected rate overlap error, and step b) or operating step b) includes ignoring the detected rate overlap error without making error reporting.

In some embodiments of the above method, controller or storage device, the interconnection protocol is Universal Flash Storage (UFS) standard.

DETAILED DESCRIPTION OF THE INVENTION

To facilitate understanding of the object, characteristics and effects of this present disclosure, embodiments together with the attached drawings for the detailed description of the present disclosure are provided.

Figure 1:
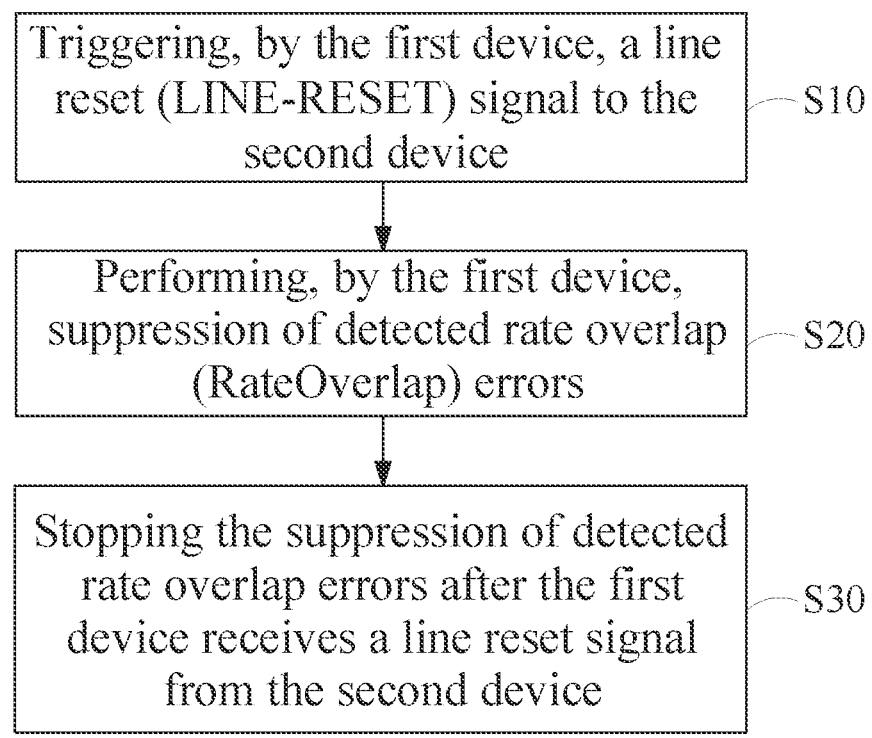
FIG. 1 is a flow chart of a method for error handling of an interconnection protocol according to an embodiment.

Referring to FIG. 1. FIG. 1 is a flow chart of a method for error handling of an interconnection protocol according to an embodiment. The method may be used in a first device (e.g., storage device 20 of FIG. 2) that is linkable to a second device according to an interconnection protocol (e.g., host 10 of FIG. 2). For the convenience of illustration, the following is an example of a storage device 20 for the first device and a host 10 for the second device. As shown in FIG. 1, the method comprises steps S10 to S30. The steps are performed in a hardware protocol engine (e.g., hardware protocol engine 23) of a link layer of the first device (e.g., storage device 20) according to the link layer of the interconnection protocol, the link layer implementing the interconnection protocol.

The method comprises: during or after a power mode change of a link between the first device and the second device: during or after a power mode change of a link between the first device and the second device.

Step S10: triggering, by the first device, a first line reset (LINE-RESET) signal to the second device.

Step S20: performing, by the first device, suppression of detected rate overlap (RateOverlap) errors.

Step S30: stopping the suppression of detected rate overlap (RateOverlap) errors after the first device receives a second line reset signal from the second device.

In some embodiments of the above-mentioned method, the power mode change is a change from a first rate to a second rate, a transmitter and a receiver of the first device share a single phase-locked loop circuit while a transmitter and a receiver of the second device utilize respective phase-locked loop circuits.

In some embodiments of the above-mentioned method, wherein before the step S10, the first device activates a suppression module for rate overlap error suppression for the link.

In some embodiments of the above-mentioned method, wherein in the step S10, the first line reset signal makes the transmitter and the receiver of the first device and the receiver of the second device reset to the first rate.

In some embodiments of the above-mentioned method, wherein in the step S20, the first device determines a frame that is sent by the second device and not at the first rate as a detected rate overlap error, and the step S20 includes ignoring the detected rate overlap error by the first device, and without making error reporting.

In some embodiments of the above-mentioned method, the interconnection protocol is Universal Flash Storage (UFS) standard.

In the embodiment of the above-mentioned method of FIG. 1, although the first device as the storage device 20 and the second device as the host 10 are illustrated, the method also applies to the first device as the host 10 and the second device as the storage device 20.

Various implementing methods according to the method of FIG. 1 is illustrated as below.

Figure 2:
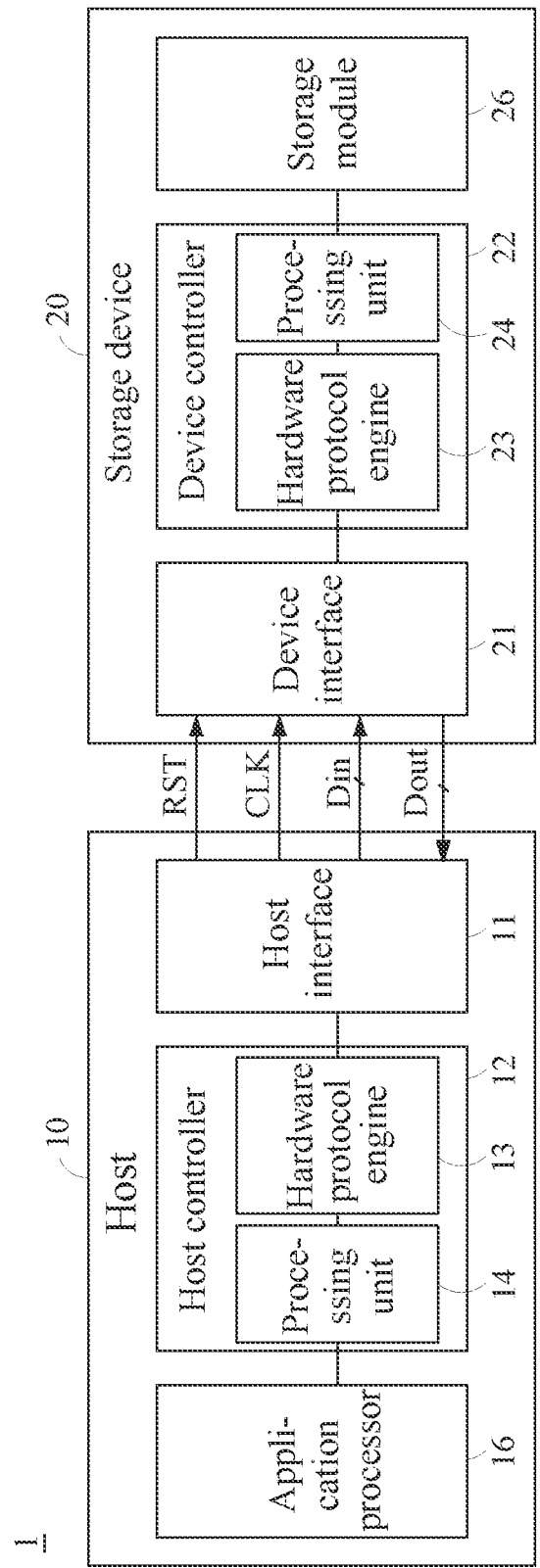
FIG. 2 is a schematic block diagram of a storage system according to an embodiment.

For the convenience of understanding and illustration, first, an implementation of circuit architecture is provided according to the technology, the circuit architecture is flexible enough and can be efficiently configured to meet the specific needs of different product manufacturers, to adapt to the design of various manufacturers and contribute to product development. As shown in FIG. 2, when the circuit architecture is applied to the storage system 1, the controller (e.g., host controller 12) of the host 10 of the storage system 1 or the controller (e.g., device controller 22) of the storage device 20 of the storage system 1 can be respectively implemented as a circuit architecture including a hardware protocol engine and a processing unit, wherein the processing unit of the controller is optional. Further for example, the combination of the host interface 11 and the host controller 12 is as a controller, such as a single chip, for the host 10; in addition, the combination of the device interface 21 and the device controller 22 is as a controller, such as a single chip, for the storage device 20.

Referring to FIG. 2, FIG. 2 is a schematic block diagram of a storage system according to an embodiment of the present disclosure. As shown in FIG. 2, the storage system 1 comprises a host 10 and a storage device 20. The host 10 and storage device 20 communicate through an interconnection protocol, thus allowing the host 10 access data to the storage device 20. The interconnection protocol, for example, is a Universal Flash Storage (UFS) standard. The host 10 is a computing device, for example, a smartphone, tablet, multimedia device. The storage device 20, for example, is a storage device inside or outside the computing device, such as a storage device based on non-volatile memory. The storage device 20 can write data under the control of the host 10 or provide a written data to the host 10. The storage device 20 may be implemented as a solid-state storage device (SSD), multimedia card (MMC), embedded MMC (eMMC), secure digital (SD) card or Universal Flash Storage (UFS) device, however, the implementation of the present disclosure is not limited to the above examples.

The host 10 comprises a host interface 11, a host controller 12 and an application processor 16.

The host interface 11 is configured to implement a physical layer of the interconnection protocol so as to link to the storage device 20. For example, the host interface 11 is configured to implement the physical (M-PHY) layer of the UFS standard.

The host controller 12 is coupled between the host interface 11 and the application processor 16. When the application processor 16 needs to access data to the storage device 20, it issues a corresponding access action instruction to the host controller 12, and communicate with the storage device 20 through the interconnection protocol, so as to achieve accessing data to the storage device 20.

The host controller 12 comprises a hardware protocol engine 13 and a processing unit 14, wherein the processing unit 14 is optional.

The hardware protocol engine 13 is configured to implement a link layer for the interconnection protocol. Taking the interconnection protocol as a UFS standard for example, the link layer is a Unified Protocol (UniPro) layer. The hardware protocol engine 13 communicates and conducts information conversion with the host interface 11 and the processing unit 14 according to the specification of the link layer.

The processing unit 14 is coupled to the hardware protocol engine 13, configured to communicate with the application processor 16. The processing unit 14 may perform one or more processes with firmware. For example, access action instructions that are issued by the operating system, driver or application performed by the application processor 16 are converted to an instruction format of the link layer that conforms to the interconnection protocol through the firmware performed by the processing unit 14, and then sent to hardware protocol engine 13 for processing according to the specification of the link layer. The firmware, for example, is an internal memory that can be stored in the processing unit 14, or an internal memory that is stored in the host controller 12, wherein the internal memory may comprise volatile memory and non-volatile memory.

The storage device 20 comprises a device interface 21, a device controller 22 and a storage module 26.

The device interface 21 is configured to implement a physical layer of the interconnection protocol so as to link to the host 10. For example, the host interface 21 is configured to implement the physical (M-PHY) layer of the UFS standard.

The device controller 22 is coupled between the device interface 21 and the storage module 26. The device controller 22 may control a write operation, read operation or erase operation of the storage module 26. The device controller 22 may exchange data with the storage module 26 through an address bus or data bus. The storage module 26, for example, is a memory chip comprising one or more non-volatile memory.

The device controller 22 comprises a hardware protocol engine 23 and a processing unit 24, wherein the processing unit 24 is optional.

The hardware protocol engine 23 is configured to implement a link layer for the interconnection protocol. Taking the interconnection protocol as a UFS standard for example, the link layer is a UniPro layer. The hardware protocol engine 23 communicates and conducts information conversion with the device interface 21 and the processing unit 24 according to the specification of the link layer.

The processing unit 24 is coupled to the hardware protocol engine 23, configured to communicate with the host 10 through the device interface 21. The processing unit 24 may perform one or more processes with firmware. For example, the processing unit 24 performs one or more processes with firmware to control or indicate the write operation, read operation or erase operation of the storage module 26, processes messages from the hardware protocol engine 23, or sends messages to the hardware protocol engine 23. The firmware, for example, is an internal memory that can be stored in the processing unit 24, an internal memory that is stored in the device controller 22, or stored in a specific storage area of the storage module 26, wherein the internal memory may comprise volatile memory and non-volatile memory.

As shown in FIG. 2, the host interface 11 may be coupled to the device interface 21 through one pair of data lines Din used to send data and another pair of data lines Dout used to receive data, the reset line RST used to send hardware reset signals, and the clock line CLK used to send data. The data lines Din and Dout may be implemented as multiple pairs, and one pair of data lines Din or Dout can be called a lane. The host interface 1I may communicate with the device interface 21 by using at least one interface protocol, such as Mobile Industry Processor Interface (MIPI), Universal Flash Storage (UFS), Small Computer System Interface (SCSI) or Serial Attached SCSI (SAS), but the implementation of the disclosure is not limited to the above examples. Under the UFS standard, the host 10 and the storage device 20 therebetween may be configured to support multiple lanes to improve transmission efficiency, wherein in either direction of the host 10 to the storage device 20 therebetween or the storage device 20 to the host 10 therebetween, now at most two lanes can be supported, the plurality of lanes in one direction are called a sub-link, multiple lanes can be chosen and set to be activated or inactivated.

The following is a detailed description of taking the interconnection protocol as a Universal Flash Storage (UFS) standard for example. The UFS standard comprises a UFS Command Set Layer (USC), a UFS Transport Layer (UTP) and a UFS Interconnect Layer (UIC). The UIC layer further comprises a Link Layer and a Physical Layer, the Link Layer of UIC is defined according to the UniPro specification, and the Physical Layer of UIC is defined according to the M-PHY specification.

Figure 3:
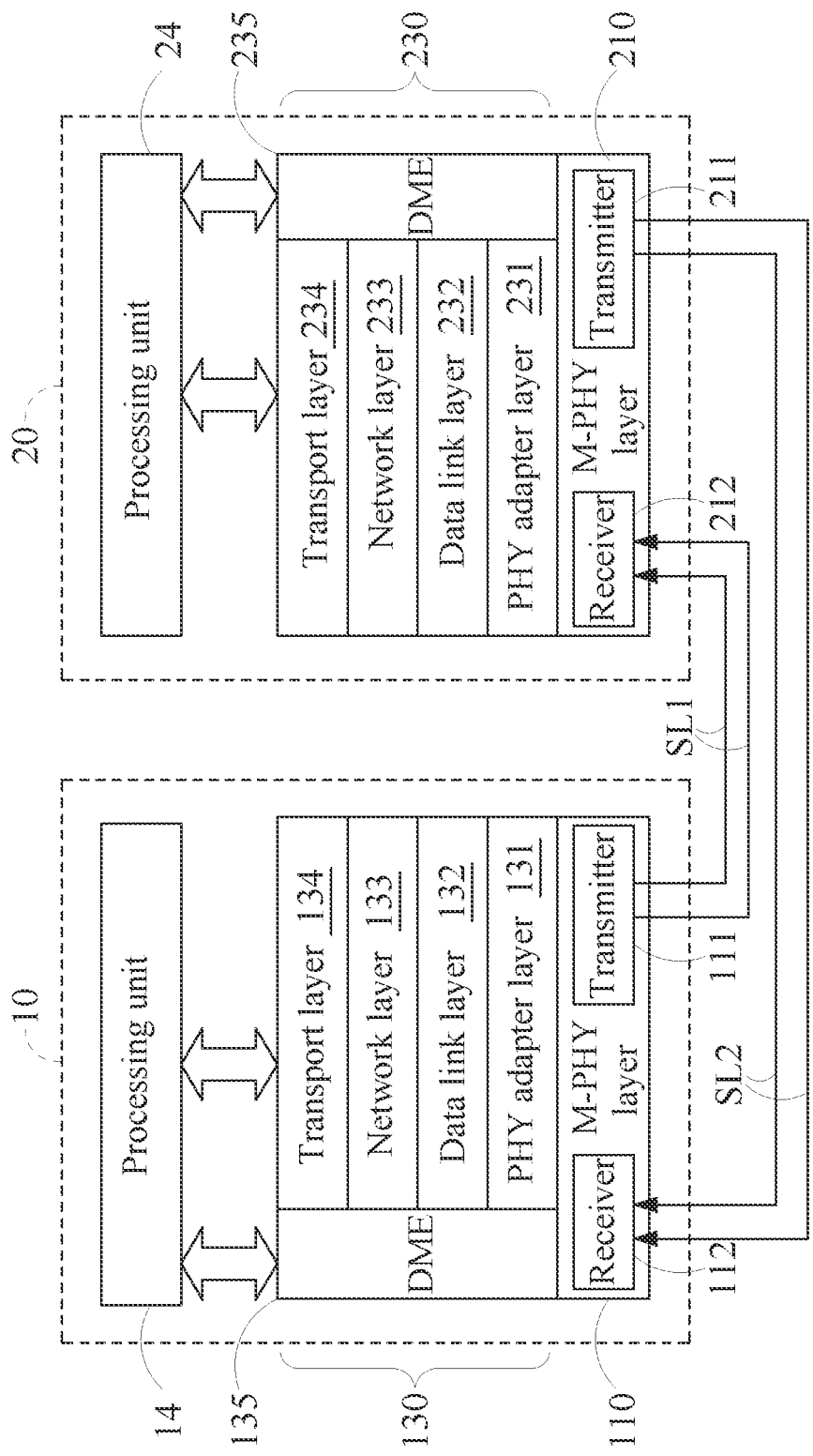
FIG. 3 is a schematic view of a layering framework of the storage system of FIG. 2 according to the UFS standard.

Referring to FIG. 3, FIG. 3 is a schematic view of a layering framework of the storage system of FIG. 2 according to the UFS standard. Since the UFS standard is based on the MIPI Unified Protocol (UniPro) layer and the MIPI physical (M-PHY) layer, the host interface 11 and the hardware protocol engine 13 of the host 10 shown in FIG. 2 are respectively used to implement a M-PHY layer 110 and a UniPro layer 130 in FIG. 3; the device interface 21 and the hardware protocol engine 23 of the storage device 20 shown in FIG. 2 are respectively used to implement a M-PHY layer 210 and a UniPro layer 230 in FIG. 3.

As shown in FIG. 3, the UniPro layer 130 (or 230) may comprise a PHY adapter layer (PA) 131 (or 231), a data link layer (DL) 132 (or 232), a network layer 133 (or 233) and a transport layer 134 (or 234). The various layers in the UniPro layer 230 of the storage device 20 may also operate and implement similarly.

The physical adapter layer (131 or 231) is used to couple the M-PHY layer (110 or 210) to the data link layer (132 or 232). The physical adapter layer (131 or 231) may perform bandwidth control, power management, and so on between the M-PHY layer (110 or 210) and the data link layer (132 or 232). In the implementation, the M-PHY layer 110 of the host 10 comprises a transmitter 111 and a receiver 112, and the M-PHY layer 210 of the storage device 20 comprises a transmitter 211 and a receiver 212, thereby establishing data lanes SL1 and SL2 for full-duplex communication. The UniPro specification supports a plurality of data lanes for sub-links in each transport direction, such as forward direction or reverse direction.

The data link layer (132 or 232) may perform flow control for data transmission between the host 10 and the storage device 20. That is, the data link layer (132 or 232) may monitor data transmission or control data transmission rate. In addition, the data link layer (132 or 232) may perform error control based on cyclic redundancy check (CRC). The data link layer (132 or 232) may use a packet received from the network layer (133 or 233) to generate a frame, or a packet may be generated by using a frame received from a physical adapter layer (131 or 231).

The network layer (133 or 233) is used to select the routing function of the transport path for packets received from the transport layer (134 or 234).

The transport layer (134 or 234) may use a command received from the UFS application layer to configure a segment that is appropriate for the protocol and send the segment to the network layer (133 or 233), or extract a command from packets received by the network layer (133 or 233) and send the command to the UFS application layer. The transport layer (134 or 234) can use sequence-based error control schemes to ensure the validity of data transmission.

Furthermore, the device management entity (DME) (135 or 235) is further defined in the UniPro layer (130 or 230), which can intercommunicate with layers in the M-PHY layer (110 or 210) and UniPro layer (130 or 230), such as the physical adapter layer (131 or 231), the data link layer (132 or 232), the network layer (133 or 231) and the transport layer (134 or 234) and even the UFS application layer, thus implementing the control or function of configuration that involves the holistic function of the Unified Protocol (UniPro), such as power on, shutdown, reset, power mode changes, etc.

The following embodiments of the application scenario on rate mode reset are used to illustrate various implementations of error handling applicable to the method of FIG. 1.

In the M-PHY specification, a multi-order link speed mode is defined, such as a high-speed link speed mode (being also known as "High-Speed Gear"), the same order link speed mode can have two different bit rates, so there are A, B two different rate series (being also known as Rate A-series and Rate B-series), such as shown in Table 1. In terms of bit rate, Rate B-series is about 15% faster than Rate A-series. For example, under a link of the HS-G1 (high speed Gear1) link defined in the M-PHY5.0 specification, Rate A-series=1248 Mbps and Rate B-series=1457.6 Mbps.

TABLE 1

| Rate A-series (Mbps) | Rate B-series (Mbps) | high-speed link speed mode (High-Speed Gear) |
|---|---|---|
| 1248 | 1457.6 | HS-G1 |
| 2496 | 2915.2 | HS-G2 |
| 4992 | 5830.4 | HS-G3 |
| 9984 | 11660.8 | HS-G4 |

In the M-PHY v5.0 specification, the primitive parameter "ResetMode" (or may be called a reset mode parameter) for rate mode reset is introduced, as shown in Table 2 below.

TABLE 2

| name | type | effective range | value | description |
|---|---|---|---|---|
| ResetMode | Enum | LS_MODE | 0 | the parameter defines a default operating mode |
| | | HS_MODE | 1 | |

In Table 2, LS_MODE represents that link startup is performed in low-rate mode, and HS_MODE represents that link startup is performed in high-rate mode. When the reset mode parameter ResetMode is set to HS_MODE (i.e., 1), it represents that the power mode between rate RateA and rate RateB changes to true, wherein in the same order link speed mode (such as HS-G1), RateA represents transmission in low-bit rate mode, and RateB represents transmission at a higher rate. The values of RateA and RateB can be set according to the rates allowable in the M-PHY specification used by the UFS standard, such as the values shown in Table 2.

Figure 4:
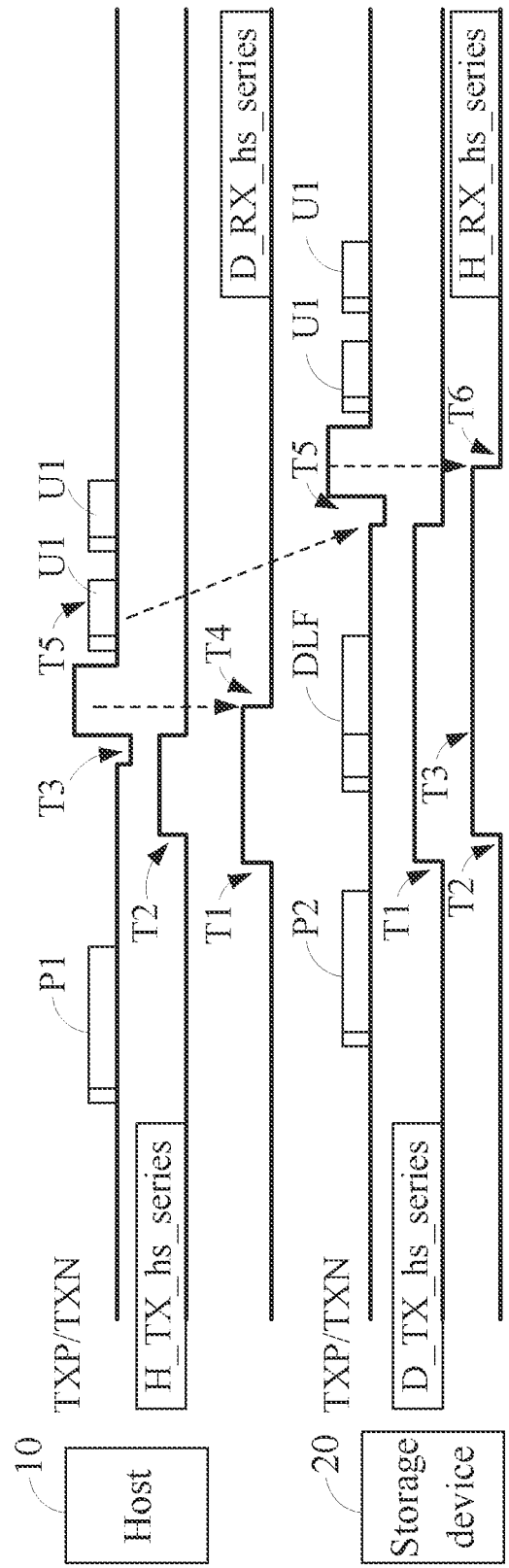
FIG. 4 is a schematic view of an example illustrating the re-link startup (Re-LinkStartup) behavior.

If the reset mode parameter ResetMode=1 is used to perform rate mode reset between the host 10 and the storage device 20, it may cause the case of FIG. 4 discussed below. Generally, there are two sub-links in a UFS system, one from the local transmitter to the remote receiver, and the other from the remote transmitter to the local receiver. Each sub-link comprises a transmitter and a corresponding receiver, and the sub-links operate independently of each other. Referring to FIG. 4, FIG. 4 is a schematic view of an example illustrating the re-link startup (Re-LinkStartup) behavior. FIG. 4 shows a schematic view of the signal between the host and the device when the ResetMode is set to an assertion state during the operation of Re-LinkStartup. In FIG. 4, TXP/TXN represents a pair of differential signals transmitted from the host to the device, H_TX_hs_series represents the rate at which a transmitter (TX) link of the host operates, H_RX_hs_series represents the rate at which a receiver (RX) link of the host operates. When H_TX_hs_series=1, it represents that the transmitter (TX) link of the host transmits data at the RateB rate. When H_TX_hs_series=0, it represents that the transmitter (TX) link of the host transmits data at the RateA rate. Similarly, D_TX_hs_series represents the rate at which a transmitter (TX) link of the device operates, D_RX_hs_series represents the rate at which a receiver (RX) link of the device operates.

Referring to FIG. 4, prior to the time point T1, the host and the device (host 10 and storage device 20 of FIG. 2) are operating at a rate RateA, and the host has proposed a request to change the power mode to a rate RateB, such as a request signal represented by pattern P1 (or P2), for example, using a primitive request (e.g., expressed in PMC.req (RateB)).

At the time point T1, the device begins to make a rate change after the power mode change is confirmed (e.g., expressed in PMC.cnf).

At the time point T2, the host receives PMC.cnf and changes the rate correspondingly. Both the host and the device enter the RateB.

At the time point T3, for some reason, the host executes LinkStartup to reinitialize to start LINE-RESET. The sub-link of the transmitter (TX) of the host is reset to rate RateA. At the same time, the sub-link of the receiver (RX) of the host remains at the rate RateB.

At the time point T4, the device recognizes LINE-RESET from the host. The sub-link of the receiver (RX) of the device is reset to rate RateA.

At the time point T5, the host begins to send a TRG0 signal (as represented by pattern U1) for the LinkStartup operation. After that, the device receives the TRG0 signal and responds with a LinkStartup starting with LINE-RESET.

At the time point T6, the host recognizes LINE-RESET from the device, so the sub-link of the receiver (RX) of the host is reset to rate RateA.

From the time points T3 to T6, the rate overlap (RateOverlap) between the sub-link of the transmitter (TX) and the sub-link of the receiver (RX) occurs on the M-PHY layer of the host, in other words, there is a mismatch between the sub-link of the transmitter (TX) and the sub-link of the receiver (RX).

The inventors of the application found that if the device had a data link layer (DL) frame (as indicated by the pattern DLF) to be sent during the time period of the time points T3 to T6, the rate overlap (RateOverlap) may bring a situation to the M-PHY layer implemented by using a single phase-locked loop (PLL). The situation is explained below.

Figure 5:
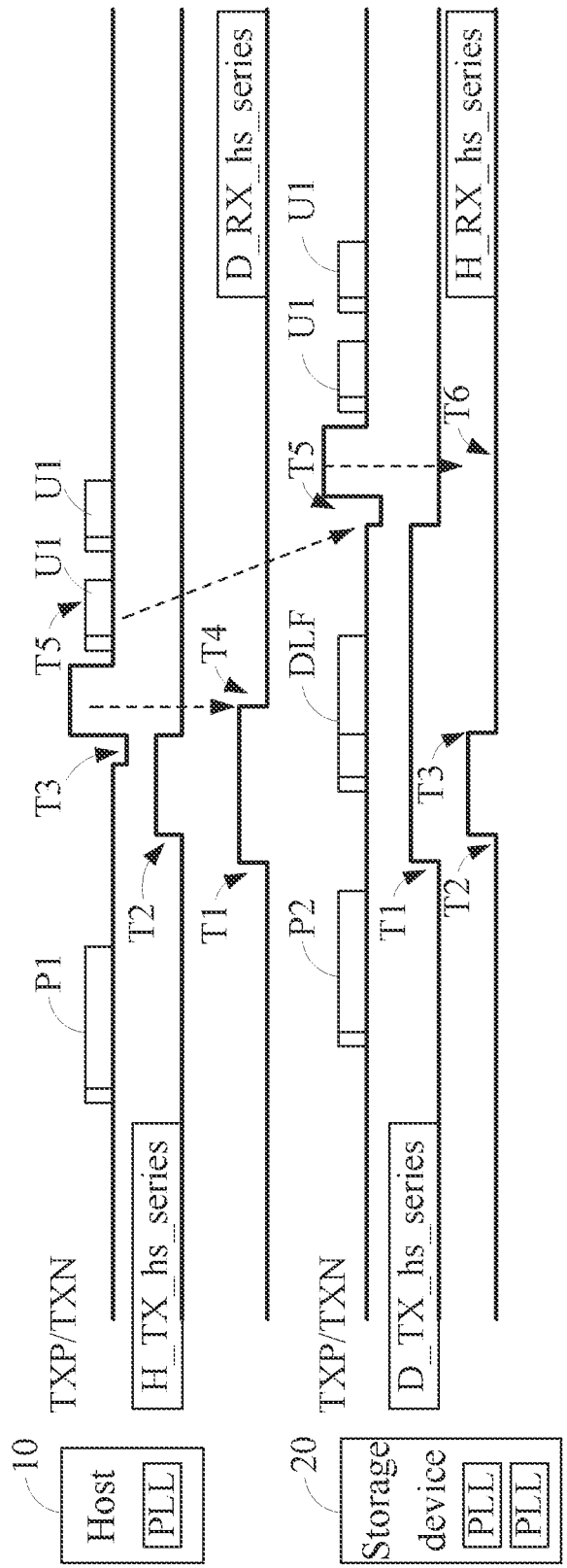
FIG. 5 is a schematic view of an example of a condition occurred by the re-link startup behavior.

Referring to FIG. 5, FIG. 5 is a schematic view of an example of a condition in which rate overlap occurs. In the condition of FIG. 5, the sub-link of the transmitter (TX) and the sub-link of the receiver (RX) of the M-PHY layer of the host can only use a single phase-locked loop (PLL). Therefore, at the time point T3, both sub-links are reset to rate RateA at the same time. However, the sub-link of the transmitter (TX) of the device is still sending a frame at rate RateB. Then, the sub-link of the receiver (RX) of the host will not recognize the frame correctly and will report an error to the UniPro layer correspondingly. Generally, after executing LinkStartup, the UniPro layer and the M-PHY layer are reinitialized. Thus, these errors may not have a great impact. However, it still carries a certain risk of leading to unknown behavior. This condition happens whenever the M-PHY layer on either side of the host/device is implemented by using a single PLL.

The above method for error handling of an interconnection protocol as shown in FIG. 1 can be used to solve the above problems in the condition of error frames in the case of rate overlap (as shown in FIG. 4 and FIG. 5), which can be used for a method for an error suppression of a single PLL implementation. It reduces the implementation complexity and cost of the M-PHY v5.0 circuit and eliminates unknown behavior. The following embodiments are further illustrated.

Figure 6:
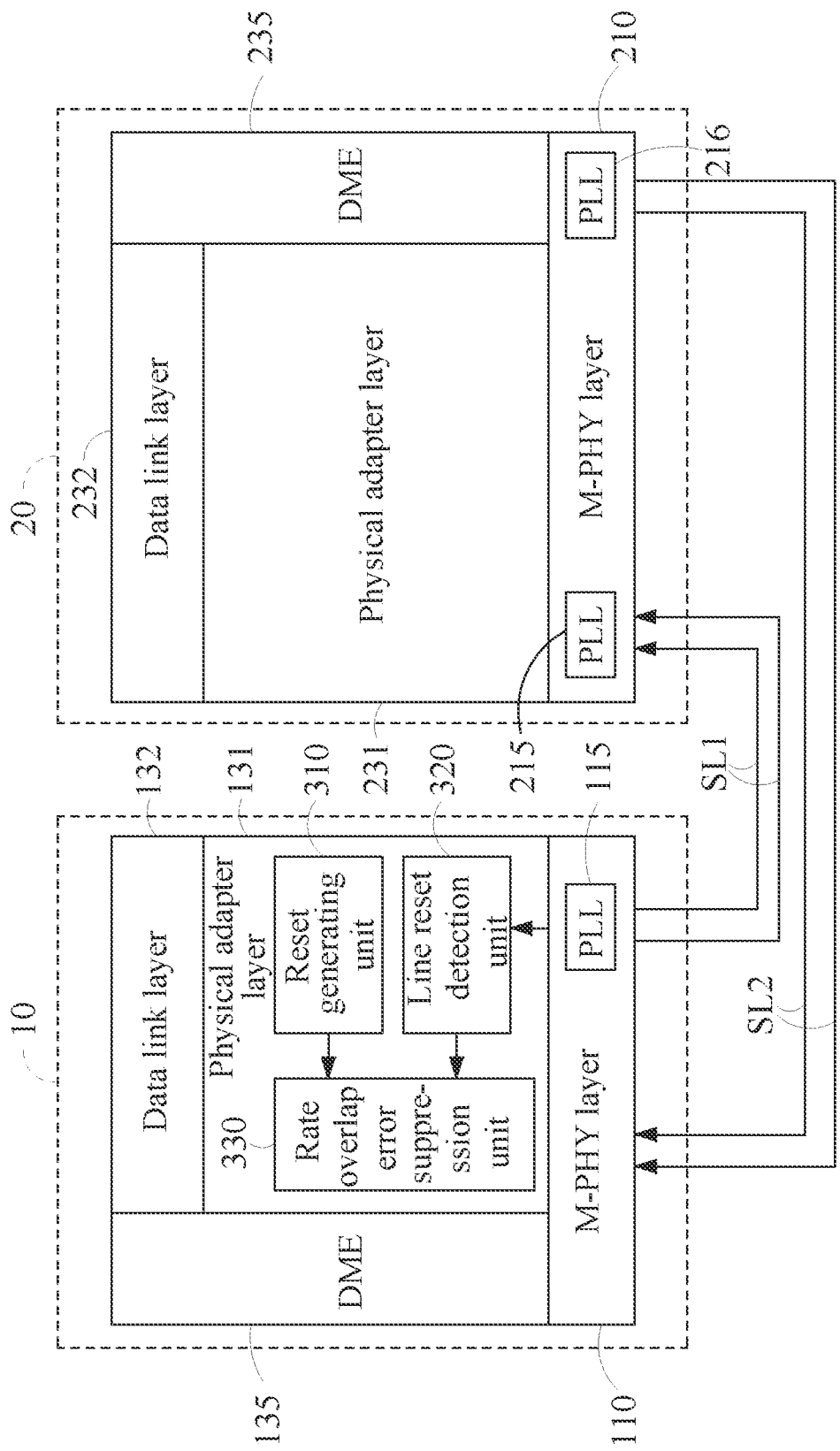
FIG. 6 is a schematic view of a circuit architecture implementing the method for error handling of the interconnection protocol according to an embodiment.

FIG. 6 shows the implementation of a local M-PHY layer with a single PLL and the implementation of a remote M-PHY layer with two PLLs. The rate overlap (RateOverlap) may occur when transferring LINE-RESET in the storage system. During the rate overlap (RateOverlap), according to the UniPro specification, the PA layer needs to detect the number of errors and report the errors to the upper layer (such as the DL layer) through the service access point PA_SAP of the PA layer. These unexpected errors may cause unknown behavior at the application procedure layer.

During the rate overlap (RateOverlap), in order to avoid the PA layer to report the errors to the upper layer through the service access point PA_SAP because of the detection of errors, FIG. 6 presents a schematic view of an embodiment of the circuit architecture implementing the above method of FIG. 1. The circuit architecture shown in FIG. 6 may be implemented by the host controller (12) of the host or the device controller (22) of the storage device, such as the physical adapter layer (131 or 231) in the hardware protocol engine of the host and the storage device to be implemented according to the method of FIG. 1. As shown in FIG. 6, in addition to implementing functions according to the UniPro specification in the physical adapter layer (131 or 231), a line reset (LINE-RESET) generating unit 310, a line reset detection unit 320 and a rate overlap (RateOverlap) error suppression unit 330 are further implemented.

In the M-PHY layer, LINE-RESET is a long-interval positive differential signal (DIF-P) for the lowest-level reset mechanism. When Line-RESET is received, the M-PHY should be reset to a default speed and all configurations should be reset as well. Because of this behavior, the rate overlap (RateOverlap) problems occur in a single PLL system.

Figure 7:
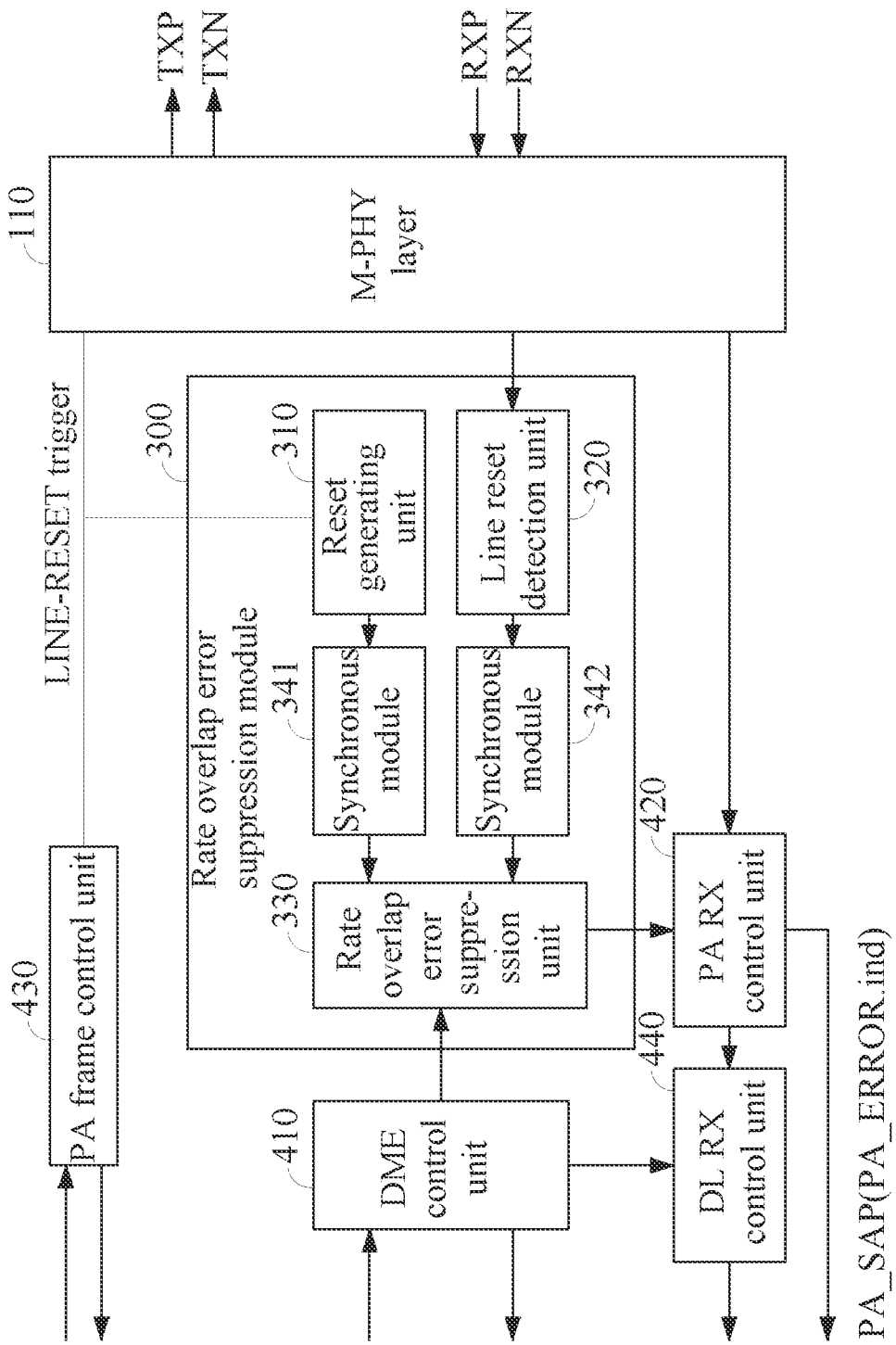
FIG. 7 is a schematic block diagram of an embodiment of the circuit architecture according to FIG. 6.

Therefore, according to the above method of FIG. 1, a circuit architecture based on LINE-RESET generation, detection and error suppression is proposed. Referring to FIG. 7, FIG. 7 is a schematic block diagram of an embodiment of the circuit architecture of FIG. 6. In FIG. 7, according to the circuit architecture of FIG. 6, the rate overlap error suppression module 300 (or be called a suppression module for short) is implemented in the physical adapter layer (131 or 231), and goes with the physical adapter layer receiver (PARX) and the physical adapter layer transmitter (PATX) to operate. The suppression module 300 comprises a reset generating unit 310, a line reset detection unit 320 and a rate overlap error suppression unit 330. The following example illustrates the function of each unit in the suppression module 300.

The reset generating unit 310 is used to check whether the device is in the process of sending line reset after receiving a trigger signal, and determines whether it is a legitimate reset trigger signal. The trigger signal, for example, is transmitted by a PA frame control unit 430.

The line reset detection unit 320 is used to detect whether a link reset signal (LINE-RESET) transmitted by the remote device is received. LINE-RESET is a long-interval positive differential signal (DIF-P). For example, the line reset detection unit 320 may be implemented to have a cycle length counter (e.g., a counter-based circuit) to determine whether the received signal is a legitimate LINE-RESET. According to the MIPI M-PHY specification, the minimum period of the signal is 1 ms at HS_MODE=0 and 100 μs at HS_MODE=1. When the link reset signal conforms to the length range, the line reset detection unit 320 will determine that the link reset signal is a legitimate LINE-RESET.

The rate overlap error suppression unit 330 is used to integrate trigger signals transmitted by the reset generating unit 310 and the line reset detection unit 320, and determine whether the current device is a design of a single phase-locked loop and whether a DME control unit 410 has activated the error suppression mechanism. After the rate overlap error suppression mechanism is activated, and when the reset generating unit 310 transmits a legitimate line reset trigger signal, the rate overlap error suppression unit 330 will determine whether there is a decoding error for the received bit stream after decoding. If a decoding error occurs, the error bit will be marked and suppressed to avoid the loss of system efficacy during the reset process. When waiting for receiving a legitimate reset signal transmitted by the line reset detection unit 320, it represents that the link reset has been completed, the rate overlap error suppression unit 330 will automatically deactivate the rate overlap error suppression mechanism, and timely report the quality of the link accurately.

As shown in FIG. 7, the suppression module 300 is configured in the PA layer of the UniPro. The rate overlap error suppression unit 330 may make the rate overlap error suppression unit 330 in an active state (or activated) or an inactive state (or disabled) through DME (e.g., DME control unit 410). If the local host (e.g., host 10 in FIG. 2) uses a single PLL system to implement the M-PHY layer (e.g., 110 in FIG. 7), DME of the UniPro of the host (e.g., DME control unit 410) may activate the rate overlap error suppression unit 330. The PA layer utilizes the reset generating unit 310 to check the generation of LINE-RESET to activate error suppression. After the PA layer utilizes the line reset detection unit 320 to receive LINE-RESET from the remote end, the PA layer makes the rate overlap error suppression unit 330 in an inactive state, so that the PA layer restores to a normal operation.

Further, according to the circuit architecture of FIG. 6, the physical adapter layer receiver (PA RX) and the physical adapter layer transmitter (PA TX) are implemented in the physical adapter layer (131 or 231), so that the rate overlap error suppression unit 330 goes with the physical adapter layer receiver (PA RX) and the physical adapter layer transmitter (PA TX) to operate. For example, when the rate overlap error suppression unit 330 is in the active state (or activated), a signal may be issued to notify the PA RX control unit 420 to stop the error check, so as to suppress the rate overlap error; when the rate overlap error suppression unit 330 is in the inactive state (or disabled), a signal may be issued to notify the PA RX control unit 420 to restore to the error check, and report the errors to the upper layer according to the UniPro specification, such as reporting errors to the DL RX control unit 440. The PA frame control unit 430 is used to receive LINE-RESET triggers.

The following example illustrates the function of a unit cooperating with the suppression module 300 in FIG. 7. The DME control unit 410 belongs to the standard device management entity (Device Management Entity) in the UniPro specification, which controls the functions of other layers and communicates with the upper layers. In some embodiments of the present disclosure, the DME control unit 410 may be implemented to have an additional control bit to select whether to activate the error suppression function.

The PA RX control unit 420, which can be implemented as a standard PA layer unit, mainly handles the received bit stream to eliminate the signal skew among multiple lanes, the multi-lane bit symbol pair remapping, decoding (8b/10b) and de-scrambling code. When the error suppression function is activated, after receiving the trigger of the rate overlap error suppression module 300, the PA RX control unit 420 will suppress the detected decoding error bit, that is, suppress the report, for example, through the primitive PA_ERROR.ind, to prevent or pause the error report.

The PA frame control unit 430, which is a standard PA layer unit, mainly handles the frame control of the transmission and reception, and may perform other operations such as transmission and module configuration checks. Thus, when the PA frame control unit 430 determines that a line reset signal needs to be sent, the reset generating unit 310 will determine whether it is a legitimate reset signal, and trigger the signal to the rate overlap error suppression module 300.

The DL RX control unit 440, which is a standard DL layer unit, mainly handles the bit stream transmitted by the PA RX control unit 420, and checks the accuracy of the data and performs transmission. When the rate overlap error suppression is started, it can also avoid the unexpected behavior caused by the unit misjudging the data.

Further, the line reset generating unit 310, the line reset detection unit 320 and the rate overlap error suppression unit 330 may be respectively implemented to operate in a different time pulse domain, and they may be coupled by means of synchronous modules 341, 342 and the mutual signal can be synchronized.

Figure 8:
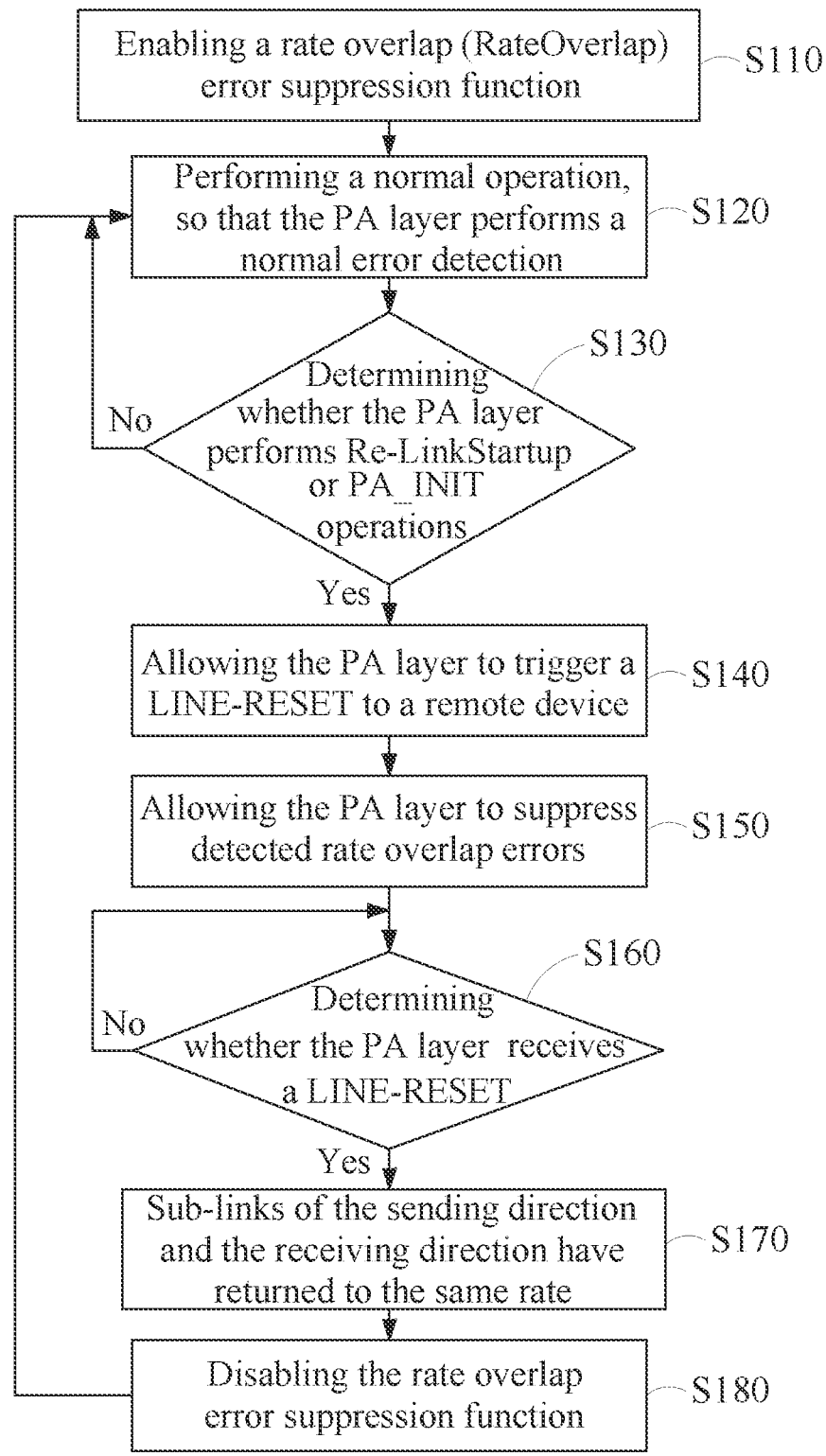
FIG. 8 is a schematic block diagram of implementing the method for error handling of the interconnection protocol according to an embodiment.

Referring to FIG. 8, FIG. 8 is a schematic block diagram of an embodiment implementing the above-described method for error handling of the interconnection protocol.

Step S110: enabling a rate overlap (RateOverlap) error suppression function.

Step S120: performing a normal operation, so that the PA layer performs a normal error detection.

Step S130: determining whether the PA layer performs Re-LinkStartup or PA_INIT operations. If step S130 determines that PA layer is performing Re-LinkStartup or PA_INIT operation, step S140 is performed; otherwise, continuing to perform the normal operation, as indicated in step S120.

Step S140: allowing the PA layer (e.g., local host 10) to trigger a LINE-RESET to a remote device (e.g., storage device 20 of FIG. 2).

Step S150: allowing the PA layer to suppress detected rate overlap (RateOverlap) errors.

Step S160: determining whether the PA layer receives LINE-RESET. If step S160 determines that PA layer has received LINE-RESET, then step S170 is performed; otherwise, continuing to perform step S160.

Step S170: Since the PA layer has received LINE-RESET, the sub-link of the sending direction and the sub-link of the receiving direction have returned to the same rate.

Step S180: disabling the rate overlap (RateOverlap) error suppression function. After that, the PA layer restores to the normal operation, as indicated in step S120, so that the PA layer performs the normal error detection.

Through the above architecture proposed in the embodiment of FIG. 6 or FIG. 7, it can prevent the occurrence of unexpected errors and improve the compatibility of the UFS system. The suppression feature is suitable for Re-Link-Startup and PA_INIT conditions including LINE-RESET behavior. Examples of detailed rate overlap (RateOverlap) error suppression behavior are shown in the following sections.

The following is a re-link startup (Re-LinkStartup) as a condition of generating a rate overlap and an example of performing error suppression according to the method of FIG. 1 is described in detail.

Figure 9A:
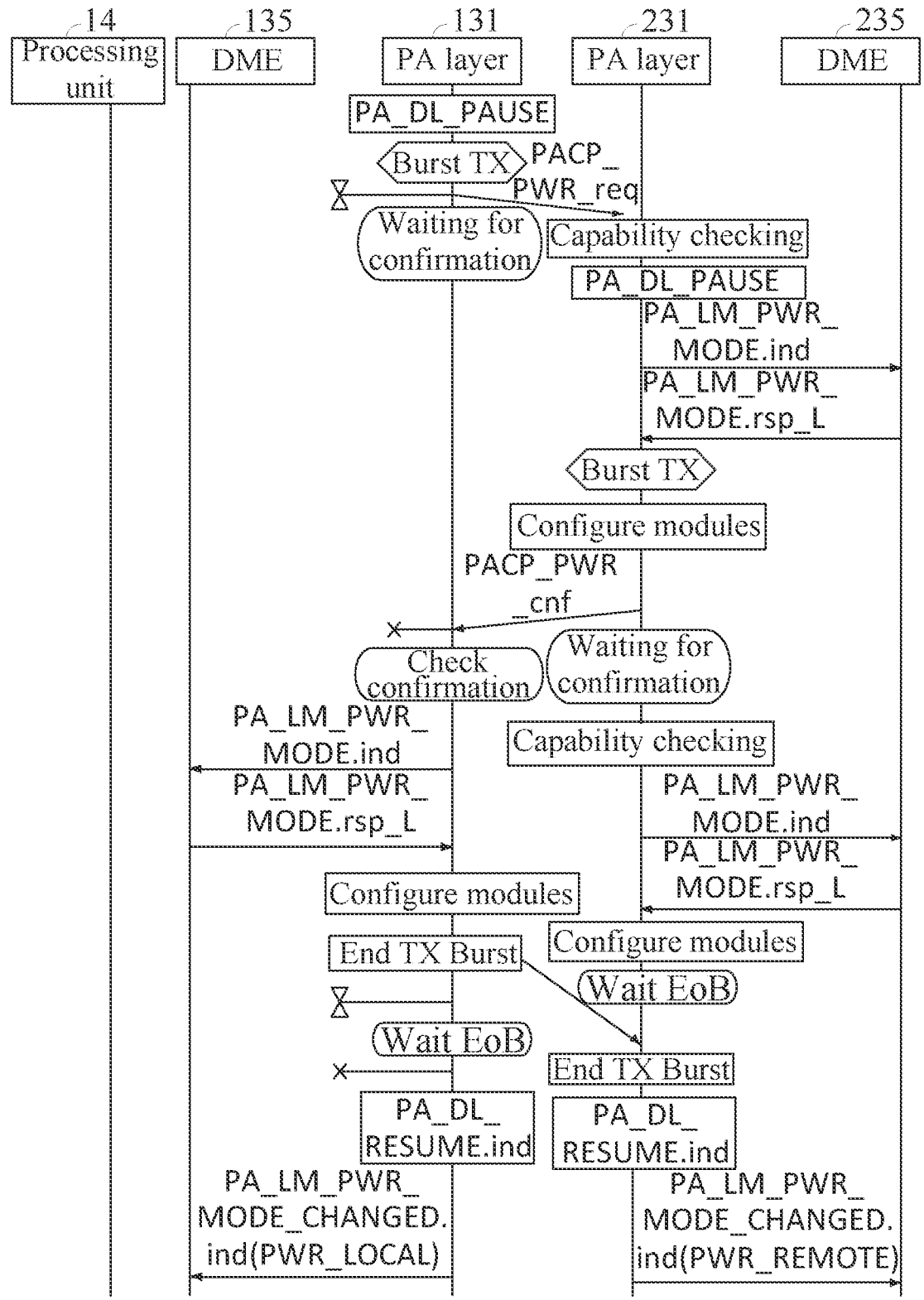
FIG. 9A is a schematic view of an example of a rate change.
Figure 9B:
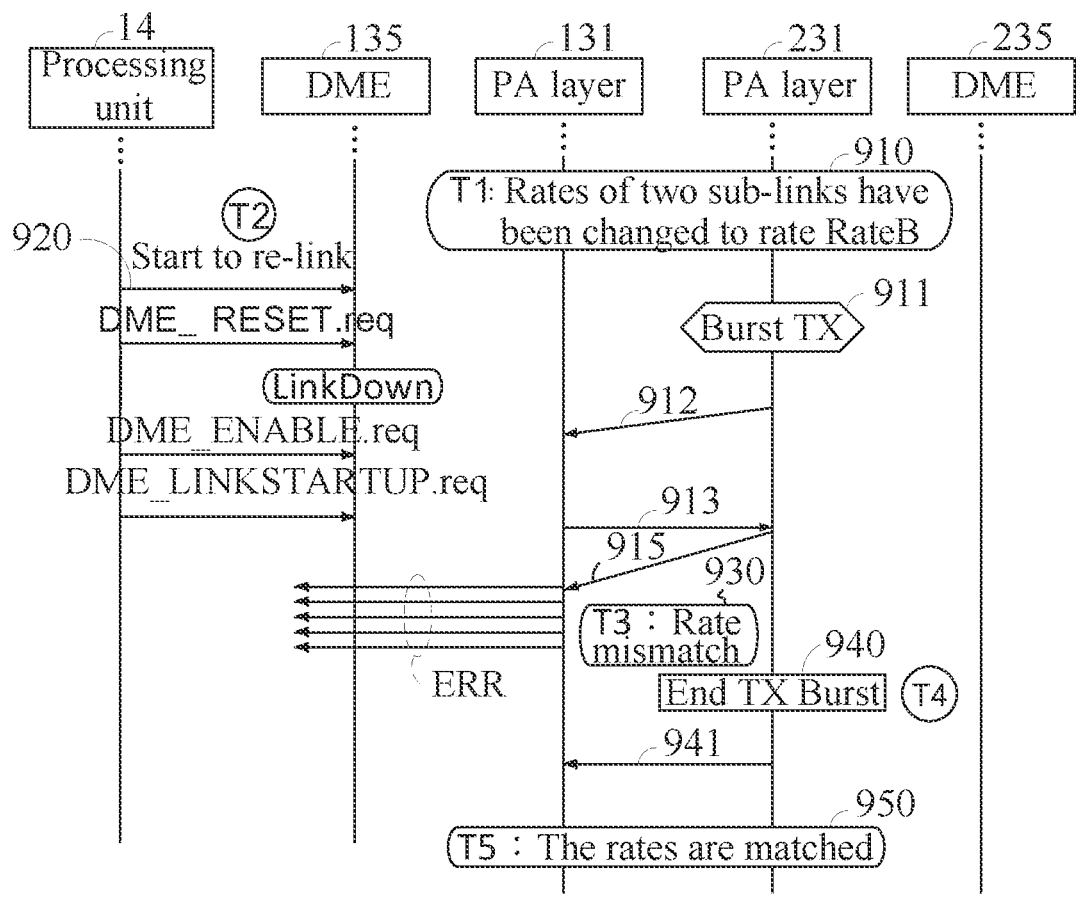
FIG. 9B is a schematic view of an example of a rate overlap occurs during the re-link startup process after the rate change of FIG. 9A.

In order to restore from critical errors or continue with a new configuration, the re-link startup (Re-LinkStartup) can be triggered from the host or the device. For the M-PHY v5.0 specification, activating ResetMode may cause RateOverlap problems. FIGS. 9A and 9B show the rate overlap (RateOverlap) problem during re-link startup (Re-LinkStartup) from the perspective of the UniPro protocol. A local end may be either the host end or the device end, and a remote end may be the other host end or the other device end. In this case, the local end is implemented by using a single PLL and the remote end is implemented by using two PLLs.

Referring to FIG. 9A, FIG. 9A is a schematic view of an example of a rate change. The procedure shown in FIG. 9A is performed according to the UniPro specification, so the process of rate change is only outlined below. First, the local PA layer 131 performs the related processing on PA_DL_PAUSE of pausing the data link layer transmission. Next, the local PA layer 131 instructs the M-PHY layer 110 to start a burst transmission (TX). The local PA layer 131 sends PACP_PWR_req frame to propose a request to the remote end to change from rate RateA to rate RateB. After that, the local PA layer 131 waits for confirmation. The remote PA layer 231 responds to the PACP_PWR_req frame and performs a capability checking according to the UniPro specification. Next, the remote PA layer 231 responds and transmits the payload to the remote DME235 through PA_LM_PWR_MODE.ind instructions. The remote DME235 responds with PA_LM_PWR_MODE.rsp_L instructions. The remote PA layer 231 performs the related processing on PA_DL_PAUSE of pausing the data link layer transmission. Then, the remote PA layer 231 instructs the M-PHY layer 210 to start a burst transmission. After that, the PA layer 231 sets the configuration of the modules, and sets the configuration of the relevant parameters or state to the modules in the M-PHY layer for this rate change. After that, the remote PA layer 231 sends PACP_PWR_cnf frame in response to the request for the rate change of the local end; in this example, the remote end responds that it can perform the rate change.

Next, as shown in FIG. 9A, the local PA layer 131 uses PA_LM_PWR_MODE.ind to transmit the payload back to the local DME135. As indicated in arrow A122, the local DME135 responds with PA_LM_PWR_MODE.rsp_L. The PA layer 131 sets the configuration of the modules, and sets the configuration of the relevant parameters or state to the modules in the M-PHY layer for this rate change. After that, the PA layer 131 instructs the M-PHY layer 110 to end the burst transmission. The local PA layer 131 waits for the end of the remote burst transmission (e.g., expressed in wait EoB (Wait EoB)).

On the other hand, the remote PA layer 231 performs capability checking according to the UniPro specification. Then, the remote PA layer 231 transmits the payload to the remote DME235 through PA_LM_PWR_MODE.ind instructions. The remote DME235 responds with PA_LM_PWR_MODE.rsp_L instructions. Next, the PA layer 231 sets the configuration of the modules, and sets the configuration of the relevant parameters or state to the modules in the M-PHY layer for this rate change. The remote PA layer 231 waits for the end of the local burst transmission (e.g., expressed in wait EoB (Wait EoB)). After the remote PA layer 231 confirms the end of the local burst transmission, the PA layer 231 instructs the M-PHY layer 210 to end the burst transmission.

On the other hand, the local PA layer 131 enters the stage of information configuration. At the same time, as shown in pattern B230, the remote PA layer 231 waits for the end of the local burst transmission (e.g., expressed in wait EoB (Wait EoB)).

Next, the local PA layer 131 uses PA_DL_RESUME.ind instructions to report that the local PA layer 131 has completed the operation and the data link layer can continue to use the link to the PA service user (e.g., DME135). The local PA layer 131 uses PA_LM_PWR_MODE_CHANGED.ind (PWR_LOCAL) instructions to inform the local DME135 the operation of the power mode change at the local end has been completed.

On the other hand, the remote PA layer 231 uses PA_DL_RESUME.ind instructions to report that the remote PA layer 231 has completed the operation and the data link layer can continue to use the link. The remote PA layer 231 uses PA_LM_PWR_MODE_CHANGED.ind (PWR_REMOTE) instructions to inform the remote DME235 the operation of the power mode change at the remote end has been completed.

FIG. 9B is a schematic view of an example of a rate overlap occurs during the re-link startup process after the rate change of FIG. 9A.

At the time point T1, as shown in pattern 910, after performing a power mode change, the rate of both sub-links is changed to rate RateB. This is because the sub-links are independent and the remote end can send any frame at a new rate RateB. As shown in arrow 911, a burst transmission (Burst TX) is started.

At the time point T2, as shown in arrow 920, the local end begins to re-link, that is, the re-link startup (Re-LinkStartup) process in the UniPro specification begins to perform, while the remote end sends a frame of the DL layer (as indicated by arrow 912). In detail, the local DME135 receives a request from a DME user (such as an upper-layer processing unit or application layer) to begin re-linking. To this end, according to the UniPro specification, DME users can request DME to reset through the primitive DME_RESET.req, in order to enter a link down (LinkDown) state; after that, DME users can request DME to perform a boot procedure through the primitive DME_ENABLE.req and request DME to perform a link up procedure through the primitive DME_LINKSTARTUP.req. At this point, since the M-PHY layer of the local end has only a single PLL, the transmitter and receiver of the M-PHY layer have been changed to rate RateA. In the link up procedure, as indicated in arrow 913, the PA layer 131 of the local end issues LINE-RESET to the PA layer 231 of the remote end through the primitive M-CTRL-LINE-REST, in order to indicate that the PA layer 231 of the remote end changes to the rate RateB. At this point, since the remote M-PHY layer has two PLLs, the receiver of the M-PHY layer has been reset to the rate RateA, but the transmitter remains at the rate RateB.

At the time point T3, since the receiver path of the local end is reset to the rate RateA and the transmitter of the remote end remains at the rate RateB, resulting in a rate mismatch, as indicated in pattern 930. At this time, if the remote end sends a frame of the DL layer (as indicated by arrow 915), it will cause the local end to receive a large number of error symbols on the RX path (as indicated by arrow ERR). From the perspective of the overall system, if the method according to FIG. 1 is not used, a large number of error symbols cause the PA layer to report errors (such as through the PA_ERROR.ind) to the upper layer (such as the DL layer, etc.), so that the upper application layer (such as the program executed by the processing unit 14) will be frequently interrupted due to the occurrence of this rate overlap (RateOverlap) phenomenon. As a result, system performance will degrade and, in the worst case, system programs will be halted.

At the time point T4, after the remote receives the LINE-RESET sent by the local end, it starts interrupting the current frame and prepares to send LINE-RESET to the local end. As shown in pattern 940, the burst transmission ends (End TX Burst). The transmitter of the remote M-PHY layer changes to the rate RateB, and as shown in arrow 941, the remote transmitter performs the reset by sending LINE-RESET to the local end, and completes the reset procedure.

After the time point T5, both sub-links are reset to the rate RateA, and all operations run at the same rate, that is, the rates of the local end and the remote end are matched, as indicated in pattern 950.

Figure 10:
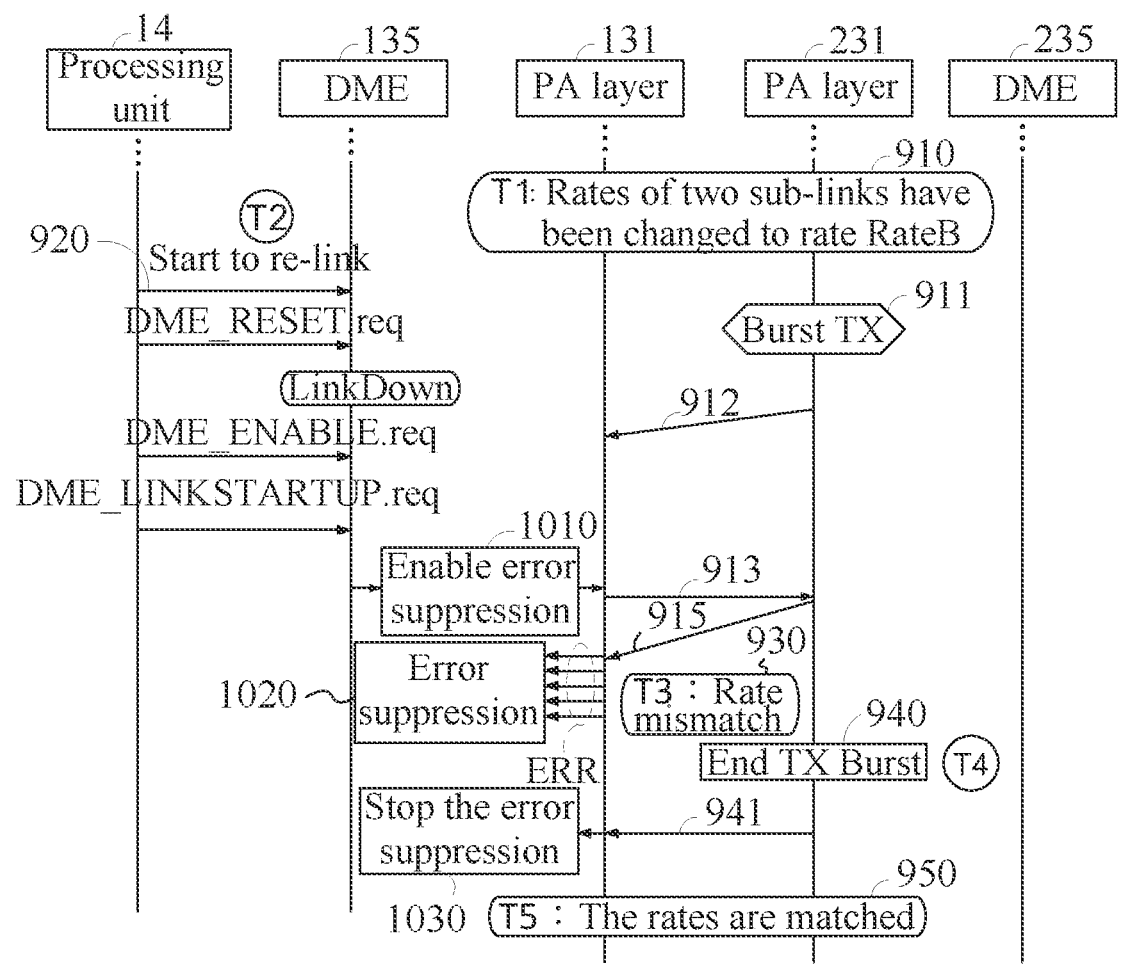
FIG. 10 is a schematic view of an embodiment of implementing the method for error handling of the interconnection protocol according to FIG. 1 during the re-link startup process after the rate change of FIG. 9A.

Referring to FIG. 10, FIG. 10 is a schematic view of an embodiment of implementing a method for error handling of the interconnection protocol according to FIG. 1 during the re-link startup process after the rate change of FIG. 9A. In this case, the local end is implemented by using a single PLL and the remote end is implemented by using two PLLs. FIG. 10 shows the above-mentioned architecture of FIGS. 6 and 7 and the method of FIG. 8 about how to improve the UniPro system to prevent the rate overlap (RateOverlap). Thus, the application layer is not affected by an unexpected number of errors because of the rate overlap (RateOverlap).

At the time point T1, as shown in pattern 910, after the power mode change, the rate of both sub-links has been changed to the rate RateB. Because the sub-links are independent, the remote end can send any frame at the new rate RateB.

At the time point T2, as shown in arrow 920, the local end starts to re-link, that is, the re-link startup (Re-LinkStartup) process in the UniPro specification begins to perform, while the remote end sends a frame of the DL layer (as indicated by arrow 912). For the process of re-linking, please refer to FIG. 9B and related descriptions, which will not be repeated herein.

At the time point T3, since the receiver path of the local end is reset to the rate RateA and the transmitter at the remote end remains at the rate RateB, resulting in a rate mismatch, as indicated in pattern 930. Before the local end sends LINE-RESET (as shown in arrow 913) for the re-link startup (Re-LinkStartup), as indicated by block 1010, the PA layer 131 is configured to activate or enable error suppression logic, thereby preventing unexpected errors from being reported to the upper layer. The error suppression logic is implemented, for example, by using the suppression module 300 of FIG. 6 or FIG. 7 or the rate overlap error suppression unit 330, wherein the local end may be configured to activate or enable the error suppression logic by DME 135 (e.g., DME control unit 410). After the local end sends LINE-RESET (as shown in arrow 913), the RX path of the local end is reset to the rate RateA because the M-PHY layer of the local end is a single PLL system. During this rate overlap (RateOverlap), the PA layer 131 of the local end will prevent or pause error reports of all unexpected symbol errors, as indicated by block 1020, error suppression is performed, thereby ignoring such symbol errors. Thus, the application layer or the processing unit 14 may continue to perform all tasks without interruption because of these unexpected errors. Thus, the system maintains performance. Those errors that are blocked or ignored are not important because the sub-link will be returned after the re-link startup (Re-LinkStartup) is completed and the DL frame will be resent from the remote end.

At the time point T4, after the remote end receives the LINE-RESET sent by the local end, it starts interrupting the current frame and prepares to send LINE-RESET to the local end. As shown in pattern 940, the burst transmission ends. After that, the PA layer 231 of the remote end sends LINE-RESET to the local end, as shown in arrow 941. The remote TX performs the reset by sending LINE-RESET to the local end.

After the local end receives LINE-RESET, the PA layer 131 of the local end disables the error suppression logic, as shown in block 1030, to stop the error suppression. If any symbol error is detected, it is restored to report error according to the UniPro specification, such as through primitive PA_ERROR.ind and primitive parameters. After the time point T5, both sub-links are reset to the rate RateA, and all operations are at the same rate, that is, the rates are matched, as shown in pattern 950.

Figure 11A:
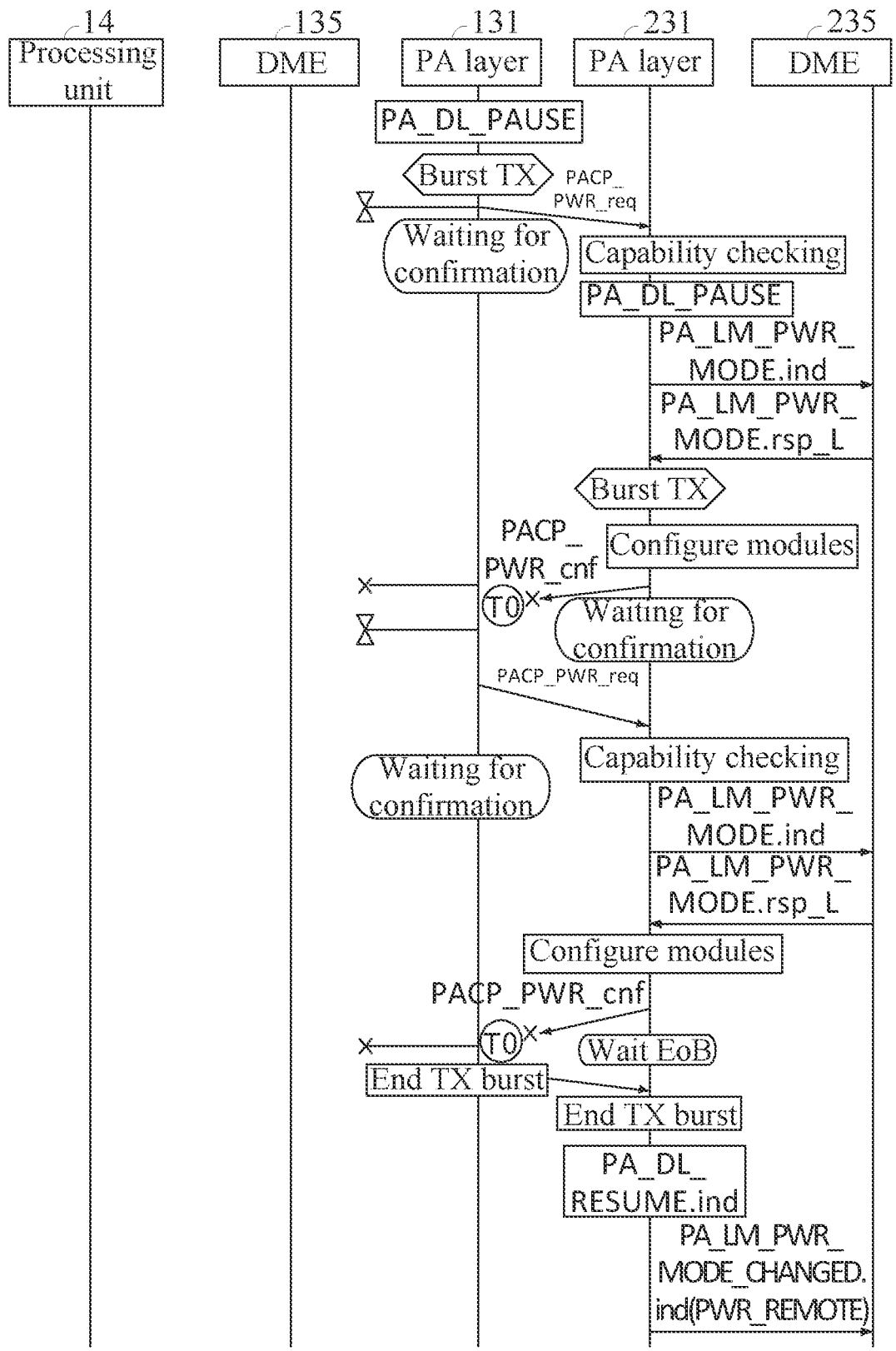
FIG. 11A is a schematic view of an example of a rate change failure.
Figure 11B:
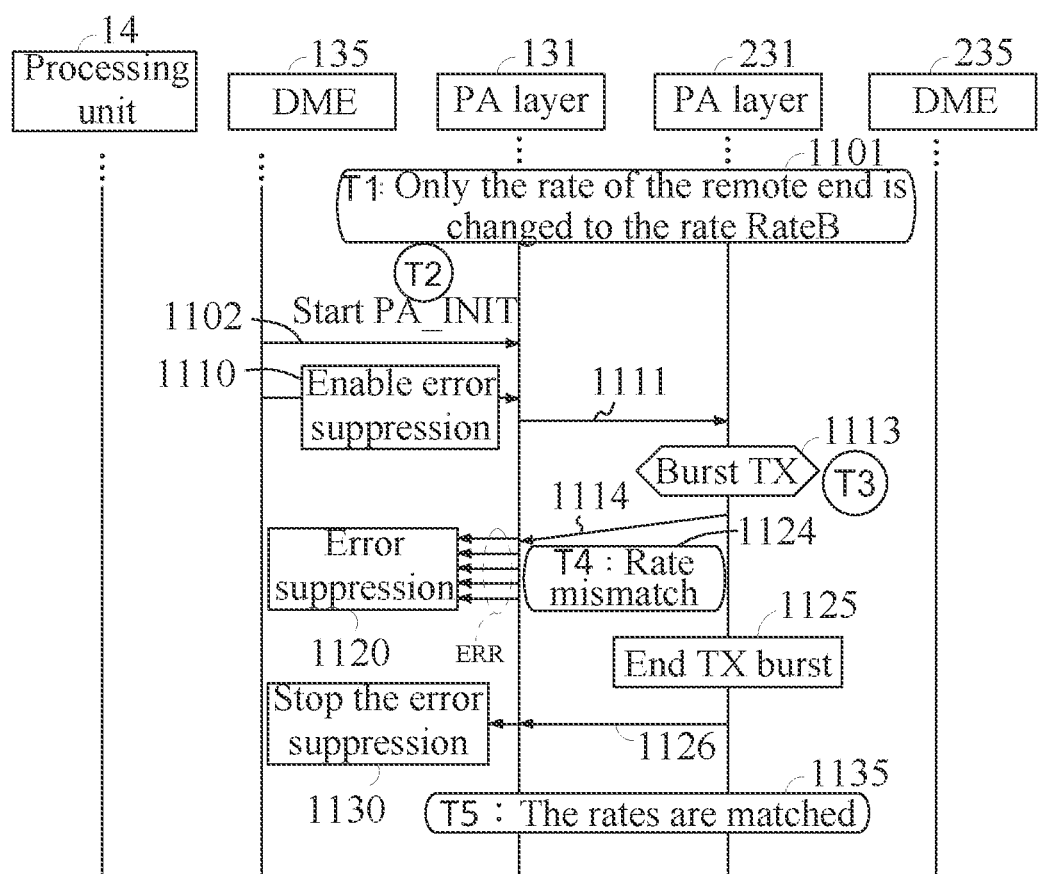
FIG. 11B is a schematic view of another embodiment of implementing the method for error handling of the interconnection protocol according to FIG. 1 during initialization after the rate change failure of FIG. 11A occurs.

FIGS. 11A and 11B show the rate overlap (RateOverlap) problem during re-initialization from the perspective of the UniPro protocol. FIG. 11A is a schematic view of an example of a rate change failure. FIG. 11B is a schematic view of another embodiment of implementing the method for error handling of the interconnection protocol according to FIG. 1 during initialization after the rate change failure of FIG. 11A occurs. In this case, the local end is implemented by using a single PLL and the remote end is implemented by using two PLLs.

UniPro provides two mechanisms to reinitialize unexpected links. A less serious mechanism is the insertion of additional deskew patterns. A stricter mechanism involves reinitializing the power configuration of the inbound link and the outbound link. The DL layer can request this mechanism by PA_INIT primitives. The following illustrates the operation of PA_INIT, and an example of suppressing unexpected errors caused by rate overlap (RateOverlap) according to the method of FIG. 1 in this operation.

The procedure shown in FIG. 11A is carried out according to the UniPro specification, for brevity, it may refer to the corresponding description of FIG. 9A; FIG. 11A differs from FIG. 9A in that the rate change process of FIG. 11A fails. In FIG. 11A, at the time point T0, some unexpected errors occurred on the sub-link. Neither the first power mode change nor the second power mode change can be completed; as shown in FIG. 11A, the local PA layer 131 sends PACP_PWR_req frame, and the remote PA layer 231 responds to the PACP_PWR_req frame and sends PACP_PWR_cnf frame in response to the request for the above-mentioned rate change of the local end, but cannot be successfully sent to the local end, shown as X in the figure. In this case, the error occurs at the local RX end. A local PA_INIT is triggered to attempt to return the link.

Referring to FIG. 11B, at the time point T1, as shown in pattern 1101, only the rate of the remote end is changed to the rate RateB. This is because the local end stops the burst transmission before issuing a reinitialization request, and the remote end detects that the received burst transmission has stopped, so it determines that the rate change has completed, and then the remote end changes the rate to a new rate RateB.

At the time point T2, as shown in arrow 1102, when the local end issues a reinitialization request (e.g., through the primitive PA_INIT in the UniPro specification), the PA layer 131 of the local end receives a trigger of PA_INIT and activates the rate overlap (RateOverlap) error suppression, as indicated by block 1110, to enable error suppression. The PA layer 131 is configured to activate or enable error suppression logic, thereby preventing unexpected errors from being reported to the upper layer. The error suppression logic is implemented, for example, by using the suppression module 300 of FIG. 6 or FIG. 7 or the rate overlap error suppression unit 330. When the PA layer 131 of the local end receives a trigger of PA_INIT and activates the rate overlap (RateOverlap) suppression, the PA layer 131 of the local end begins to activate an error detection logic and sends LINE-RESET to the remote end (as shown in arrow 1111).

At the time point T3, as shown in pattern 1113, the remote end starts the burst transmission, and prepares to simultaneously send the frame of the DL layer, as shown in arrow 1114.

At the time point T4, since the M-PHY layer of the local end uses a single PLL, the receiver path of the local end is reset to the rate RateA and the transmitter of the remote end remains at the rate RateB, resulting in a rate mismatch, as indicated in pattern 1124. The link of the receiver of the local end resets to the rate RateA, but the transmitter of the remote end remains at the RateB for frame transmission, as shown in arrow 1114. During this rate overlap (RateOverlap), the PA layer 131 of the local end will prevent or pause error reports of all unexpected symbol errors (as indicated by arrow ERR), as indicated by block 1120, error suppression is performed, thereby ignoring such symbol errors. Thus, the application layer or the processing unit 14 may continue to perform all tasks without interruption because of these unexpected errors. Thus, the system maintains performance.

After the remote end receives the LINE-RESET sent by the local end, it starts interrupting the current frame and prepares to send LINE-RESET to the local end. As shown in pattern 1125, the burst transmission ends. After that, the remote transmitter performs the reset by sending LINE-RESET (as shown in arrow 1126) to the local end. At this point, after the local end receives LINE-RESET, the PA layer 131 of the local end disables the error suppression logic, as shown in block 1130, the error suppression is stopped.

At the time point T5, after the local end receives LINE-RESET, the PA layer 131 of the local end disables the rate overlap (RateOverlap) error suppression logic, at this time, if any symbol error is detected, the PA layer 131 of the local end is restored to report error according to the UniPro specification, such as through primitive PA_ERROR.ind and primitive parameters. After the time point T5, both sub-links are reset to the rate RateA, and all operations are at the same rate, that is, the rates are matched, as shown in pattern 1135.

From the description of the conditions of a re-link startup (Re-LinkStartup) and a reinitialization request (e.g., through primitive PA_INIT), the rate overlap (RateOverlap) error suppression architecture proposed according to the method of FIG. 1 can make the UFS system obtain a more stable and highly compatible effect. In other words, according to the method of FIG. 1, the local (or remote) PA layer may be configured to ignore rate overlap errors without reporting to the upper layer, so that the UFS system can be implemented to avoid the loss of system efficacy situation that may occur during the reset process under the requirements of the original error handling of the interconnection protocol.

In the above-described embodiments of FIG. 9A to FIG. 11B, although the first device as the host 10 and the second device as the storage device 20 are illustrated, other embodiments according to the embodiments may also be adjusted to apply to the first device as the storage device 20 and the second device as the host 10.

In addition, in the above embodiments for the host and the storage device, the hardware protocol engine in the host controller or device controller can be designed based on technologies of any other design method using a hardware description language (HDL) such as the Verilog language or digital circuit familiar to those skilled in the art, and can be implemented based on the use of field programmable gate array (FPGA), or one or more circuits such as application specific integrated circuit (ASIC) or complex programmable logic device (CPLD), can also be implemented by using proprietary circuits or modules. The host controller or device controller (or a processing unit or hardware protocol engine thereof) can also be implemented based on a microcontroller, processor, or digital signal processor.

While the present disclosure has been described by means of specific embodiments, numerous modifications and variations could be made thereto by those skilled in the art without departing from the scope and spirit of the present disclosure set forth in the claims.

What is claimed is:

1. A method for error handling of an interconnection protocol, for use in a first device that is linkable to a second device according to the interconnection protocol, the method comprising:

during or after a power mode change of a link between the first device and the second device:
a) triggering, by the first device, a first line reset (LINE-RESET) signal to the second device;
b) performing, by the first device, suppression of detected rate overlap (RateOverlap) errors; and
c) stopping the suppression of detected rate overlap (RateOverlap) errors after the first device receives a second line reset signal from the second device.

2. The method according to claim 1, wherein the power mode change is a change from a first rate to a second rate, a transmitter and a receiver of the first device share a single phase-locked loop circuit while a transmitter and a receiver of the second device utilize respective phase-locked loop circuits.

3. The method according to claim 2, wherein before step a), the first device activates a suppression module for rate overlap error suppression for the link.

4. The method according to claim 2, wherein in step a), the first line reset signal makes the transmitter and the receiver of the first device and the receiver of the second device reset to the first rate.

5. The method according to claim 2, wherein in step b), the first device determines a frame that is sent by the second device and not at the first rate as a detected rate overlap error, and step b) includes ignoring the detected rate overlap error by the first device without making error reporting.

6. The method according to claim 1, wherein the interconnection protocol is Universal Flash Storage (UFS) standard.

7. A controller for use in a first device that is linkable to a second device according to an interconnection protocol, the controller comprising:
  an interface circuit, configured to implement a physical layer of the interconnection protocol so as to link to the second device; and
  a device controller, configured to be coupled to the interface circuit and configured to implement a link layer of the interconnection protocol, wherein during or after a power mode change of a link between the first device and the second device, the device controller is configured to perform a plurality of operations, the plurality of operations including:
  a) triggering, by the first device, a first line reset (LINE-RESET) signal to the second device;
  b) performing, by the first device, suppression of detected rate overlap (RateOverlap) errors; and
  c) stopping the suppression of detected rate overlap (RateOverlap) errors after the first device receives a second line reset signal from the second device.

8. The controller according to claim 7, wherein the power mode change is a change from a first rate to a second rate, a transmitter and a receiver of the first device share a single phase-locked loop circuit while a transmitter and a receiver of the second device utilize respective phase-locked loop circuits.

9. The controller according to claim 8, wherein before the operation a), the first device activates a suppression module for rate overlap error suppression for the link.

10. The controller according to claim 8, wherein in the operation a), the first line reset signal makes the transmitter and the receiver of the first device and the receiver of the second device reset to the first rate.

11. The controller according to claim 8, wherein in the step b), the first device determines a frame that is sent by the second device and not at the first rate as a detected rate overlap error, and the step b) includes ignoring the detected rate overlap error by the first device without making error reporting.

12. The controller according to claim 7, wherein the interconnection protocol is Universal Flash Storage (UFS) standard.

13. A storage device, operable to link to a host according to an interconnection protocol, the storage device comprising:
  a storage module;
  an interface circuit, configured to implement a physical layer of the interconnection protocol so as to link to the host; and
  a device controller, configured to be coupled to the interface circuit and the storage module and configured to implement a link layer of the interconnection protocol, wherein during or after a power mode change of a link between the storage device and the host, the device controller is configured to perform a plurality of operations, the plurality of operations including:
  a) triggering, by the storage device, a first line reset (LINE-RESET) signal to the host;
  b) performing, by the storage device, suppression of detected rate overlap (RateOverlap) errors; and
  c) stopping the suppression of detected rate overlap (RateOverlap) errors after the storage device receives a second line reset signal from the host.

14. The storage device according to claim 13, wherein the power mode change is a change from a first rate to a second rate, a transmitter and a receiver of the storage device share a single phase-locked loop circuit while a transmitter and a receiver of the host utilize respective phase-locked loop circuits.

15. The storage device according to claim 13, wherein the interconnection protocol is Universal Flash Storage (UFS) standard.

* * * * *